US008562438B2

(12) United States Patent
Schueller

(10) Patent No.: US 8,562,438 B2
(45) Date of Patent: Oct. 22, 2013

(54) SYSTEM AND METHOD FOR TELEVISION-BASED SERVICES

(75) Inventor: Darren Schueller, Oceanside, CA (US)

(73) Assignee: NTN Buzztime, Inc., Carlsbad, CA (US)

( * ) Notice: Subject to any disclaimer, the term of this patent is extended or adjusted under 35 U.S.C. 154(b) by 1272 days.

(21) Appl. No.: 11/925,644

(22) Filed: Oct. 26, 2007

(65) Prior Publication Data

US 2008/0102954 A1    May 1, 2008

Related U.S. Application Data

(60) Provisional application No. 60/863,105, filed on Oct. 26, 2006.

(51) Int. Cl.
*A63F 13/00* (2006.01)
(52) U.S. Cl.
USPC .............................................. 463/40; 463/42
(58) Field of Classification Search
USPC ................... 463/40, 42, 29; 725/151
See application file for complete search history.

(56) References Cited

U.S. PATENT DOCUMENTS

| | | | | |
|---|---|---|---|---|
| 5,592,212 A | * | 1/1997 | Handelman | 725/114 |
| 5,851,149 A | * | 12/1998 | Xidos et al. | 463/42 |
| 6,903,681 B2 | | 6/2005 | Faris et al. | |
| 6,929,549 B1 | | 8/2005 | Yamada | |
| 7,035,246 B2 | | 4/2006 | Taylor | |
| 7,065,553 B1 | | 6/2006 | Chesley et al. | |
| 7,133,927 B2 | | 11/2006 | Guo et al. | |
| 7,143,177 B1 | | 11/2006 | Johnson et al. | |
| 2002/0034980 A1 | * | 3/2002 | Lemmons et al. | 463/40 |
| 2002/0129349 A1 | | 9/2002 | Ebisawa | |
| 2002/0142843 A1 | | 10/2002 | Roelofs | |
| 2003/0195022 A1 | * | 10/2003 | Lynch et al. | 463/1 |
| 2004/0038692 A1 | | 2/2004 | Muzaffar | |
| 2004/0087372 A1 | | 5/2004 | Yamana et al. | |
| 2004/0111484 A1 | | 6/2004 | Young et al. | |
| 2006/0205516 A1 | | 9/2006 | Yeend et al. | |

(Continued)

FOREIGN PATENT DOCUMENTS

KR   10-2006-0083051   7/2006

OTHER PUBLICATIONS

Lee, Jong Ick, Authorized Officer, Korean Intellectual Property Office, Patent Application No. PCT/US2008/058955, Filed Mar. 31, 2008, in Written Opinion, mailed Aug. 14, 2008, 10 pages.

(Continued)

*Primary Examiner* — Arthur O. Hall
*Assistant Examiner* — Allen Chan
(74) *Attorney, Agent, or Firm* — Thibault Patent Group

(57) ABSTRACT

Methods, systems, and apparatus, including computer program products, for executing an interactive game in a television distribution system. In one aspect, a method includes receiving input over the television distribution system from a game client indicating an action associated with a game instance, wherein the game client is hosted on a set-top box; determining an updated status of the game instance based on the action; generating a game status message identifying the updated status of the game instance; and transmitting the game status message to the game client. Further, the game status message can be transmitted to a plurality of game clients participating in the game instance. Additionally, input can be received over the television distribution system from another game client indicating a second action associated with the game instance and an updated status of the game instance can be determined based on the second action.

8 Claims, 7 Drawing Sheets

(56) References Cited

U.S. PATENT DOCUMENTS

2007/0127519 A1* 6/2007 Hasek et al. ............... 370/466
2007/0293320 A1 12/2007 Nguyen et al.
2009/0300363 A1 12/2009 Hamalainen et al.

OTHER PUBLICATIONS

Play Along TV Limited, "SYNC TV Interactive broadcast participation," Copyright 2006, 1 page.

Weatherford, Syvila, Examiner U.S. Patent Office, U.S. Appl. No. 12/060,127, filed Mar. 31, 2008, in Office Action dated Feb. 3, 2011, 15 pages.

Weatherford, Syvila, Examiner U.S. Patent Office, U.S. Appl. No. 12/060,127, filed Mar. 31, 2008, in Office Action dated Sep. 7, 2011, 16 pages.

* cited by examiner

SYSTEM AND METHOD FOR TELEVISION-BASED SERVICES

CROSS-REFERENCE TO RELATED APPLICATION

This application claims priority to U.S. Provisional Application Ser. No. 60/863,105 filed Oct. 26, 2006, entitled "Multiplayer Gaming Infrastructure". The disclosure of the prior application is considered part of, and is incorporated by reference in, the disclosure of this application.

BACKGROUND

The present disclosure relates to the provision of interactive services to one or more users over a television distribution system, including interactive gaming services.

Television signal distribution architectures have been developed to provide alternatives to traditional over-the-air broadcasting. For example, since the late 1940's, cable television systems have been used to deliver television signals to subscribers. Cable television systems distribute signals over optical fibers and/or electrical cables, such as coaxial cable. Further, wireless-cable systems have been developed using microwave signals as the distribution medium. Cable television systems permit the distribution of both typical over-the-air content, such as broadcast networks, and specialized content, such as pay channels and video on demand.

In a cable television system, television programming representing a number of individual television channels is coordinated at a headend for distribution to subscribers, such as endpoints within a particular geographic region. All of the endpoints serviced by a headend receive a common signal. Television programming representing a plurality of separate frequency bands is multiplexed onto a single cable. The television signal can be encoded as an analog signal or a digital signal. A set-top box (or "cable television tuner") at the receiving location, such as a subscriber's home or business, provides access to a single channel of the multiplexed signal. Thus, a single channel included in the cable television signal can be tuned and presented on a corresponding device, such as a television or computer monitor.

Direct broadcast satellite (or "direct-to-home") television systems also have been developed as an alternative to over-the-air broadcasting. As with cable television, direct broadcast satellite television provides a single, multiplexed signal that is decoded using a set-top box (or "satellite receiver"). The distribution medium between the satellite broadcaster and the set-top box, however, is a radio frequency signal, such as a $K_u$-band transmission.

Until recently, both cable and satellite television distribution systems were limited to receive-only. Because coaxial cables are capable of bi-directional transmission, however, additional services have been merged with cable television systems. For example, voice and data services have been offered over cable television distribution systems. Similarly, the cable television transmission path can serve as a back-channel for information sent from the set-top box to the cable television provider. Typically the bandwidth upstream from a set-top box to a headend is lower than the downstream bandwidth from the headend to the set-top box. Further, satellite television providers also have implemented bi-directional communication capabilities and are offering additional services, such as internet connectivity, in conjunction with the television signal distribution architecture.

SUMMARY

An interactive service involving one or more subscribers (or users) can be provided over a television distribution system. For example, game-play can be initiated from a client device, such as a set-top box included in the television distribution system. Further, execution and coordination of a game instance can be controlled by a server device included in the television distribution system. For example, the server device can be configured to control access to a game, to manage game play, to record game scores, and to facilitate communication and interaction between subscribers participating in one or more game instances. Other interactive services also can be provided over the television distribution system, including shopping, weather forecasts, and chatting.

In order to provide interactive services over a television distribution system, the present inventors recognized the need to permit bi-directional communication over the television distribution system relating to the interactive service between a client device, such as a set-top box, and a server device, such as a game server or server cluster. Further, the present inventors recognized the need to permit authenticating by the server device one or more client device users.

The present inventors also recognized the need for the server device to communicate with a plurality of client devices, which can be configured to communicate using different protocols or message formats. Further, the need to utilize a plurality of server devices within the television distribution system also was recognized. Additionally, the present inventors also recognized the need to utilize a single, global protocol for communication between elements within a server device. The single, global communication protocol also can be used for communication between server devices. Accordingly, the techniques and apparatus described here implement algorithms for providing interactive services over a television distribution system.

In general, in one aspect, the subject matter can be implemented to include receiving input over the television distribution system from a game client indicating an action associated with a game instance, wherein the game client is hosted on a set-top box; determining an updated status of the game instance based on the action; generating a game status message identifying the updated status of the game instance; and transmitting the game status message to the game client.

The subject matter also can be implemented to include transmitting the game status message to a plurality of game clients participating in the game instance. Further, the subject matter can be implemented to include receiving input over the television distribution system from another game client indicating a second action associated with the game instance and determining an updated status of the game instance based on the second action. Additionally, the subject matter can be implemented to include processing the game status message by the game client to generate a current status of the game instance at the set-top box.

In general, in another aspect, the techniques can be implemented as a computer program product, encoded on a computer-readable medium, operable to cause data processing apparatus to perform operations comprising receiving input over a television distribution system from a game client indicating an action associated with a game instance, wherein the game client is hosted on a set-top box included in the television distribution system; determining an updated status of the game instance based on the action; generating a game status message identifying the updated status of the game instance; and transmitting the game status message to the game client.

The subject matter also can be implemented to be operable to cause data processing apparatus to perform operations comprising transmitting the game status message to a plurality of game clients participating in the game instance. The subject matter further can be implemented to be operable to cause data processing apparatus to perform operations comprising receiving input over the television distribution system from another game client indicating a second action associated with the game instance and determining an updated status of the game instance based on the second action. Additionally, the subject matter further can be implemented to be operable to cause data processing apparatus to perform operations comprising processing the game status message by the game client to generate a current status of the game instance at the set-top box.

In general, in another aspect, the subject matter can be implemented as a system including a game client hosted on a set-top box included in a television distribution system; and a server including processor electronics configured to perform operations comprising receiving input over the television distribution system from the game client indicating an action associated with a game instance; determining an updated status of the game instance based on the action; generating a game status message identifying the updated status of the game instance; and transmitting the game status message to the game client.

The subject matter also can be implemented such that the processor electronics are further configured to perform operations comprising transmitting the game status message to a plurality of game clients participating in the game instance. Further, the subject matter can be implemented such that the processor electronics are further configured to perform operations comprising receiving input from another game client indicating a second action associated with the game instance and determining an updated status of the game instance based on the second action. Additionally, the subject matter can be implemented such that the processor electronics are further configured to perform operations comprising processing the game status message by the game client to generate a current status of the game instance.

In general, in another aspect, the subject matter can be implemented as a system including an interactive services client hosted on a set-top box included in a television distribution system; and a server including processor electronics configured to perform operations comprising receiving a request from the interactive services client to participate in an interactive service hosted by the server; verifying that the interactive services client is authorized to participate in the interactive service; and assigning the interactive services client to a process corresponding to the interactive service.

The techniques described in this specification can be implemented to realize one or more of the following advantages. For example, the techniques can be implemented such that one or more client devices can participate in interactive services provided by one or more server devices in a television distribution system. The techniques also can be implemented such that a plurality of client devices, two or more of which are configured to utilize a different communication protocol, can interact over the television distribution system. Additionally, the techniques can be implemented to include utilizing a single, global communication protocol by the one or more server devices included in the television distribution system.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
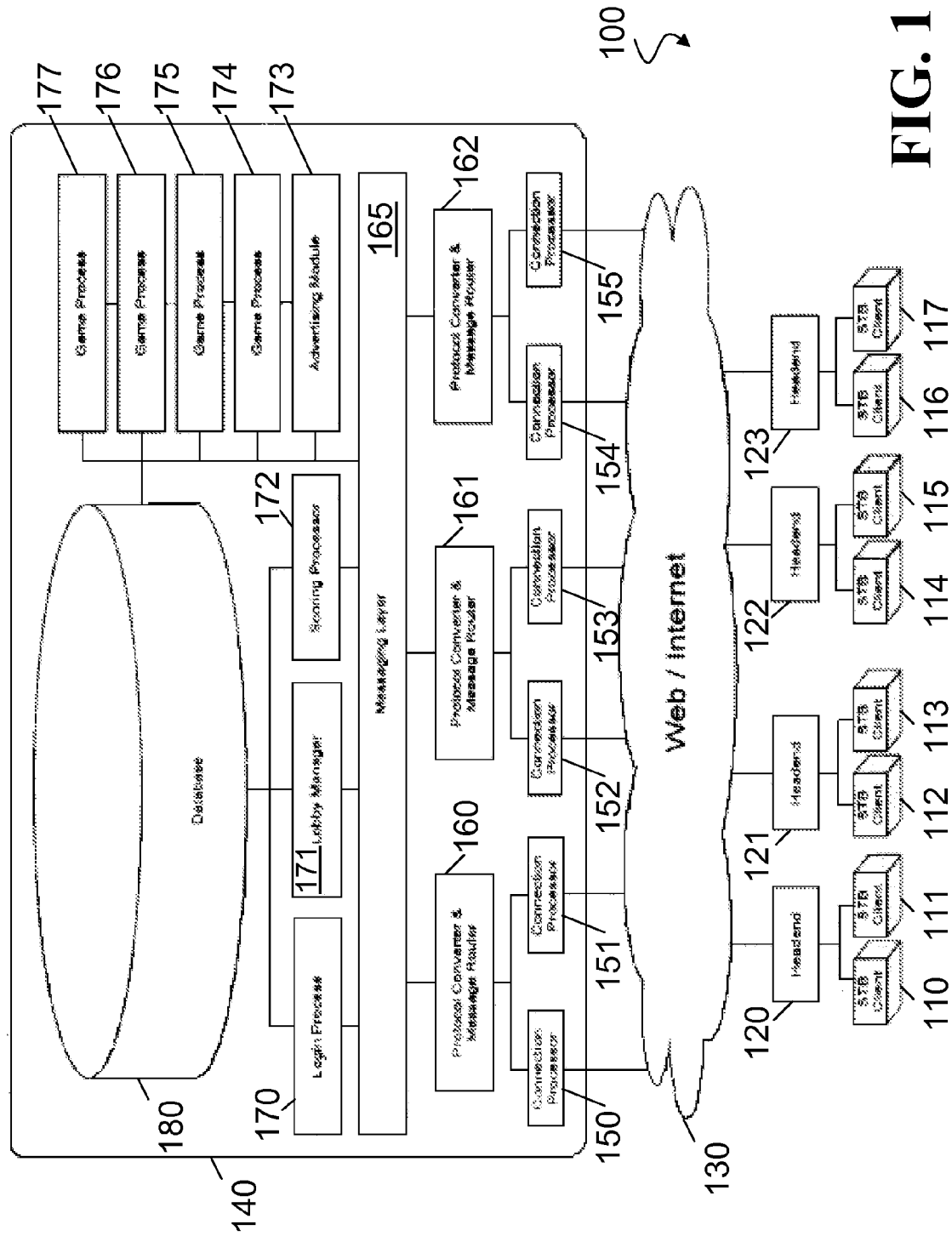
FIG. 1 shows an example of a television distribution system.

FIG. 1 shows an example of a television distribution system 100. The television distribution system 100 can include a plurality of set-top boxes (STBs), such as STBs 110-117. An STB can be utilized to provide access to a channel of a cable television signal, such as a multiplexed signal representing a plurality of separate channels. Further, an STB can be configured to provide access to one or more interactive services, including gaming, chatting, shopping, and information retrieval services. Interactive gaming is presented as an exemplary implementation, but a wide variety of interactive services can be provided over the television distribution system 100. In an implementation, the television distribution system 100 can be a satellite television system that permits bi-directional communication.

A game player (or "subscriber") can access one or more interactive games through an STB, such as the STB 110. For example, the STB 110 can be located at the game player's home or office. Further, the game player can access one or more interactive games through any STB that has been provisioned in the television distribution system 100. The STB 110 can be connected to one or more display devices, such as a television or monitor. The STB 110 also can be connected to one or more audio output devices, such as speakers or an audio receiver. Further, the STB can be coupled with one or more peripheral devices, such as one or more joysticks, game pads, keyboards, keypads, and/or controllers. Each of the peripheral devices can be coupled with the STB 110 over a wired or wireless interface. Additionally, one or more remote control devices can be used to communicate with the STB 110.

In an implementation, one or more aspects can differ between the STBs 110-117, including the manufacturer, the operating instructions (or middleware), the configuration, the communications interface, and the hardware, such as the memory and/or the processor. Additionally, the television distribution system 100 can include STBs associated with two or more cable television systems or service providers.

Figure 2:
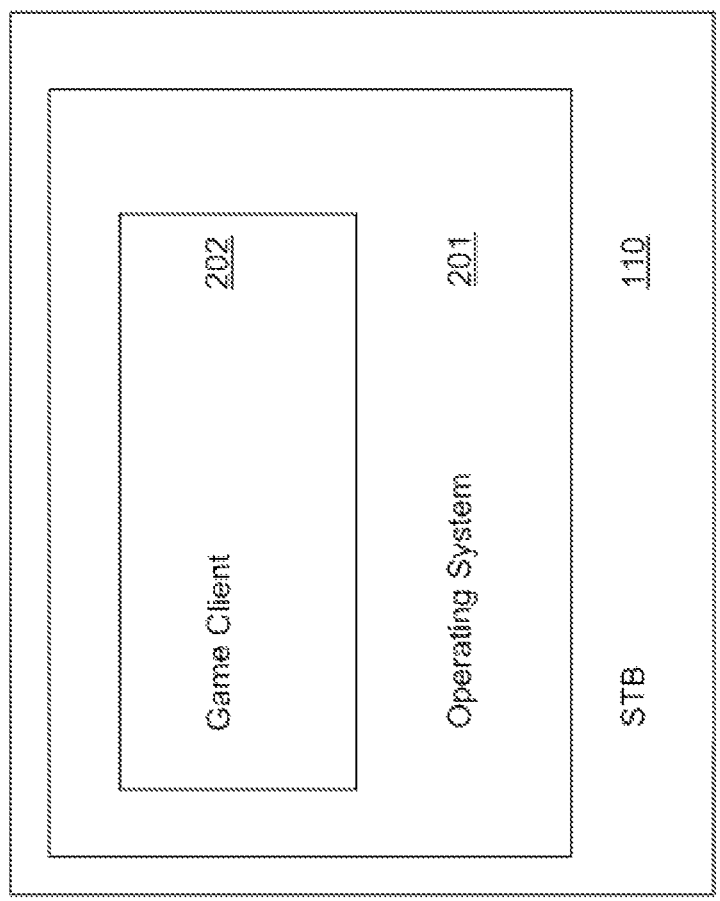
FIG. 2 shows an example of components included in a set-top box.

FIG. 2 shows an example of components included in a set-top box, such as the STB 110. The STB 110 can be configured to execute an operating system 201 that can provide access to one or more interactive services offered by the television distribution system 100. The operating system 201 also can be configured to control the operations of the STB 110, including communicating with the television distribution system 100, providing output to a corresponding display device, and receiving input from a user. In an implementation, the operating system 201 further can be operable to configure the STB 110 as a gaming platform that can execute one or more game clients, such as the game client 202. Further, the game client 202 can be configured to manage the execution of one or more game instances at the STB 110, including poker game instances, trivia game instances and billiards game instances. The game client 202 can communicate with a remote game server, such as a server cluster, to execute a game instance. Additionally, the game client 202 can receive input from one or more users relating to playing (or "executing") a game instance. For example, a user can enter commands through an STB remote control device or other controller.

An STB can be connected to a headend through a bi-directional communication path. A headend can receive input from and provide output to one or more STBs. For example, the STBs 110-117 can be connected to the headends 120-123. In the television distribution system 100, one or more cable television providers operate the headends 120-123 to provide television programming and interactive services to corresponding STBs. The STBs associated with a headend receive a common signal from that headend. Further, a headend can be configured to provide connectivity to the internet 130 for one or more associated STBs. In some implementations, the headend can serve as a proxy or router for the one or more STBs connected to the headend.

Additionally, the STBs that are connected to a headend can use any desired communication protocol and message format. For example, the STBs 110 and 111 can communicate with the corresponding headend 120 using any desired communication protocol, such as the Aloha or slotted Aloha protocol. STBs associated with a different headend, such as the headend 121, can use the same communication protocol and message format as is used in conjunction with the headend 120 or a different communication protocol and/or message format.

Further, the game client 202 running on the STB 110 can communicate with the server cluster 140. When the game client 202 initiates communication a connection, such as a secure socket layer (SSL) connection, can be established between the headend 120 and the server cluster 140 over the internet 130. The connection can be made with a connection processor, such as the connection processor 151, included in the server cluster 140. When the game client 202 on the STB 110 transmits data, the headend 120 forwards the transmitted data over the connection to the connection processor 151. Further, the headend 120 can forward the transmitted data using any communication protocol and message format. For example, the headend 120 can translate the data received from the STB 110 into a different communication protocol and/or message format.

The connection processors 151-156 are configured to terminate the connections established between the various headends 120-123 and the server cluster 140. In a distributed environment, such as the one shown in the television distribution system 100, a headend can establish a connection with any available connection processor included in the server cluster 140, such as one of the connection processors 151-156. In an implementation, a headend also can establish a connection with a plurality of connection processors of the server cluster 140, such as for different services on the same STB or services associated with different STBs. In another implementation, a headend can establish connections with a plurality of server clusters, such as server clusters offering different interactive services. Upon receiving a message on the connection, the connection processor included in the server cluster 140 forwards the message to a corresponding protocol converter and message router 160. In some implementations, the protocol converter can be realized in an element separate from the message router.

The protocol converter and message router 160 can be configured to translate the received message from the communication protocol and message format utilized by the STB and/or headend into the communication protocol and message format utilized within the server cluster 140. For example, a gaming platform of an STB that uses the Flash programming language can transmit one or more XML-based messages to the server cluster 140 through a corresponding headend. The protocol converter and message router 160, which is associated with the server cluster 140 can translate the XML-based messages received from the headend into a communication protocol and message format utilized within the server cluster 140. For example, the server cluster 140 can be configured to utilize a single, standard communication protocol and message format (or "cluster protocol") for all messages routed within the server cluster 140. Further, the protocol converter and message router 160 can be configured to translate messages from the cluster protocol into a communication protocol and message format that is compatible with an STB to which the message is being sent.

The protocol converter and message router 160 also can be configured to distribute the converted message to one or more processes and/or modules included in the server cluster 140, such as the login process 170, the lobby manager 171, the scoring processor 172, the advertising module 173, one or more game processes 174-177, and the database 180. For example, the protocol converter and message router 160 can pass the converted message to the messaging layer 165 for distribution. In some implementations, the messaging layer 165 can implement the JMS message model. The protocol converter and message router 160 also can be configured to distribute messages to one or more other protocol converters and message routers included in the server cluster 140, such as the protocol converters and message routers 163-165.

The messaging layer 165 can be configured to distribute messages between elements included in the server cluster 140, including the protocol converters and message routers, the database 180, the login process 170, the lobby manager 171, the scoring processor 172, the advertising module 173, and one or more game processes. Further, the messaging layer 165 can include one or more message channels or message queues through which messages are routed.

In some implementations, the messaging layer 165 can implement a "Publish/Subscribe" model for message distribution to the server cluster 140 elements, including the processes and modules. In the "Publish/Subscribe" model, an element of the server cluster 140 that is configured to communicate with the messaging layer 165 can subscribe to one or more predetermined message types and/or messages including one or more predetermined identifiers. For example, the login process 170 can subscribe to login messages received by the server cluster 140. Thus, login messages received by the server cluster 140 can be routed by the messaging layer 165 to the login process 170. For example, a received login message can be inserted into a message queue associated with the login process 170 by the messaging layer 165. The login process 170 can then retrieve the login message from the message queue for processing. An element included in the server cluster 140 can have one or more associated message queues. A game process also can subscribe to messages from one or more clients that are participating in a game instance associated with the game process.

A process executing in the server cluster 140 also can transmit one or more messages to a target STB. For example, a game process executing on the server cluster 140 can generate a game status message that is to be transmitted to a game client executing on the target STB. The game status message can include an indicator associated with the target STB. Further, the game process can pass the game status message to the messaging layer, where the message can be inserted into a message queue associated with the protocol converter and message router subscribing to messages relating to the target STB. The protocol converter and message router can route the message through an associated connection processor to a network, over which the game status message can be delivered to the headend associated with the target STB. The headend then can insert the game status message into the data signal provided to the subscribing STBs connected to the headend and the message can be retrieved by the target STB.

The login process 170 of the server cluster 140 can uniquely identify a subscriber before permitting the subscriber to participate in an interactive service. For example, before a subscriber can begin a game hosted by the server cluster 140, the subscriber can be directed to log in, such as by presenting a login screen. In response, the subscriber can submit a login request to the login process 170 through the game client 202 hosted on the STB 110, such as by supplying a username and password. In some implementations, either or both of the username and password can be stored on the STB 110. The supplied username and password can be transmitted in one or more messages from the STB 110 to the login process 170 for login and authentication purposes. For example, the username and password can be transmitted through the headend 120 to the internet 130 and then through the connection processor 151, the protocol converter and message router 160, and the messaging layer 165. An alternative communication path using one or more other elements also can be used if available.

Further, the login process 170 can be configured to query corresponding user data from the database 180 in order to perform the login and authentication. The game client 202 also can be configured to utilize a common application programming interface (API) for communication with the login process 170. The common API can be responsible for transmitting the login information to the login process 170, verifying the login result, and returning the user identifier to the game client 202. The user identifier can be utilized to uniquely identify the subscriber while the subscriber's session is active. Once the game client 202 has been authenticated, the user can be given access to one or more menus associated with interactive services available through the server cluster 140, such as one or more interactive games.

A lobby manager 171 also can be included in the server cluster 140. The lobby manager 171 can be configured to track the location of the subscriber within a game environment while the game client 202 is connected to the server cluster 140. For example, a game environment can include one or more virtual lobbies with which a subscriber can be associated, such as a poker lobby. The poker lobby further can be associated with one or more poker game rooms, in which separate poker game instances can be played. Additionally, the game environment can include a lobby associated with one or more other games, such as billiards and checkers. In another implementation, a plurality of lobbies can be associated with a game provided in a game environment. The server cluster 140 can manage one or more game environments. Further, a game environment can be defined that spans a plurality of server clusters. A subscriber can select which environment or server cluster to join, such as by selecting a predefined world or game. Alternatively, a subscriber can be automatically assigned to an environment or server cluster, such as by the headend.

The lobby manager 171 can store the location of one or more subscribers in the database 180. A subscriber can move between lobbies and/or rooms included in the game environment by issuing one or more commands to the game client 202. When a subscriber move occurs, the lobby manager 171 can update the database 180 to reflect the subscriber's new location. The lobby manager 171 also can send a notification message announcing the player move to one or more subscribers, such as subscribers associated with the lobby the player left and subscribers associated with the lobby the player joined. Additionally, the lobby manager 171 can send a notification message to one or more other subscribers, such as buddies, who have requested information regarding the location of the subscriber who has changed locations.

A lobby can be utilized to organize a plurality of common game instances or subscriber groupings. A game instance can be created for each "bottom level" room that corresponds to a lobby, based on a set of configuration characteristics. A fixed-room hierarchy can be used, in which game rooms can be generated as needed in accordance with one or more sets of configuration characteristics. Further, dynamic-room creation can be implemented to allow one or more subscribers to create a game instance in accordance with a custom set of configuration characteristics, such as game settings and difficulty parameters. Access to a dynamically created room also can be controlled, such as through invitation or password. Two or more rooms for which the associated configuration characteristics vary can be associated with a common lobby.

In addition, a lobby can be used as a "chat point", where subscribers can engage in text-based chat sessions with one another. As with games, chat points can be organized by a topic or a subscriber group. A chat system in the server cluster 140 can be configured to allow a subscriber to access a list of pre-programmed text strings, which can be initialized before a chat session is initiated or joined. Further, text can be entered by a subscriber through an on-screen interface generated by the STB. For example, a virtual keyboard can be displayed in which letters, numbers, and special purpose characters are selected through use of a remote control device.

A game process, such as the game processes 174-177, represents a server-side component of a game application. For example, the game process 174 can be a self contained entity that is configured to generate a game state for one or more connected game clients, such as the game client 202 of the STB 110. In an implementation, the game process 174 can be configured to generate a poker game and can be responsible for determining what cards are dealt to each subscriber (or player) participating in the game, managing the value of the pot, controlling the sequence of the game, and determining which player wins a hand. Further, the game process 174 can interface with the database 180 to save information representing a persistent game state and to register the statistics associated with the players, such as each player's bank. A game process, such as the game process 174, can be initialized by the lobby manager 171 when a subscriber elects to host a game of a specific type. In another example, a game process can be automatically initialized by the lobby manager 171, such as when only a predetermined number of available positions remain in the existing game processes.

A scoring processor 172 included in the server cluster 140 permits a game process, such as the game processes 174-177, and/or a game client, such as the game client 202, to post scoring data. The scoring data can include game specific data and events. Further, the scoring data can be used to rank subscribers who participate in a game environment. In an implementation, the user rankings and associated statistics can be stored in the database 180. The scoring processor 172 can be configured to track data submitted for one or more games, and can provide current rankings based on the scoring data, such as in response to a game event or a request. A request can be generated by a game client 202 or a game process. For example, a subscriber playing a single player game, such as checkers, can submit the time taken to win a game instance to the scoring processor 172 via a client scoring system API. In another example, the game process associated with a multiplayer game, such as billiards, can post one or more items of user ranking data on behalf of the game participants.

The server cluster 140 also can include an advertising module 173, which can be configured to manage advertising content. The advertising module 173 also can schedule advertising content for delivery to an STB, such as in response to a game event or at a predetermined interval. In some implementations, an advertisement can comprise a full screen image or full-screen, full-motion video. Further, audio content also can be associated with an advertisement. In some implementations, an advertisement also can be an image or video sequence that occupies a smaller portion of a display or screen, such as a banner embedded in the game space. For example, a sponsor's logo can be displayed on the surface of a poker or pool table. The advertising module 173 can indicate to the game client 202 through one or more messages that a particular advertisement is to be presented at a predetermined time or in response to a predetermined event. In some implementations, the advertising module 173 can be configured to select one or more advertisements for presentation based on a parameter, such as the geographical location of a headend or an STB.

Figure 3:
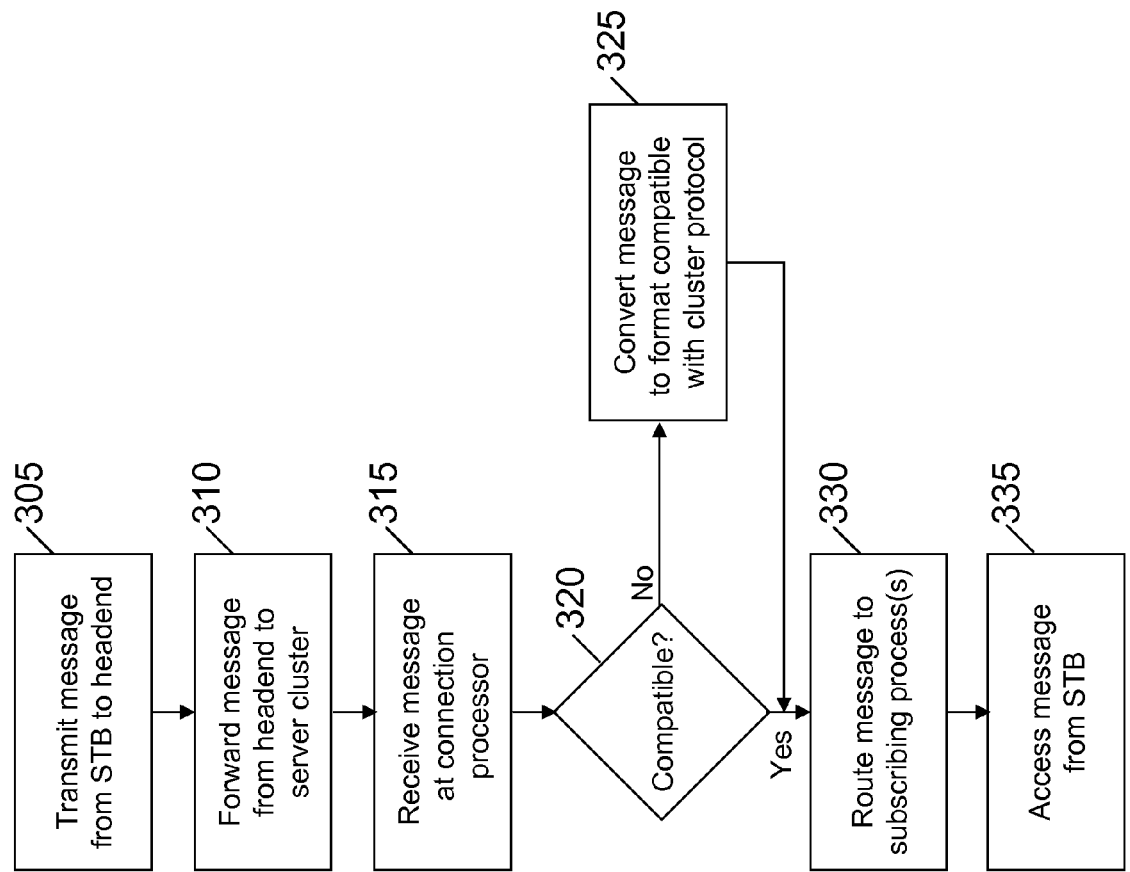
FIG. 3 shows an example of a message flow between a set-top box and the messaging layer of a server cluster.

FIG. 3 shows an example of a message flow between an STB, such as the STB 110, and the messaging layer of a server cluster. The STB can generate a message, such as based on a subscriber input, and transmit 305 the message to the corresponding headend. For example, the STB can transmit the message to the corresponding headend using a socket-based protocol, such as the slotted Aloha protocol. Any communication protocol, however, can be used for communication between the STB and the headend. Upon receiving the message from the STB, the headend can forward 310 the message over a network to a server cluster. The network can be a public network, such as the internet, or a private network, such as a local area network or a wide area network. In an implementation, the headend can communicate with the server cluster over a connection, such as a secure socket layer (SSL) connection. Further, the headend can serve as a router for the one or more STBs connected to the headend.

A connection processor, such as the connection processor 151, included in the server cluster 140 can be configured to communicate with the headend over the connection. In a distributed network environment, such as the internet, any connection processor included in the server cluster can serve as the connection point for the headend. Further, a connection processor included in the server cluster can communicate with a plurality of headends.

The connection processor receives 315 the message for processing in the server cluster. For example, the connection processor can be configured to receive the message over the connection with the headend and to pass the message to a corresponding protocol converter and message router included in the server cluster, such as the protocol converter and message router 160. A protocol converter and message router can receive messages from a plurality of connection processors.

The protocol converter and message router can be configured to determine the format of a received message. For example, the protocol converter can determine how the message has been encoded and/or how the message is structured. Further, the protocol converter and message router can determine 320 whether the message is compatible with the cluster protocol utilized within the server cluster. If the message is not compatible with the cluster protocol, the message can be converted 325 into a compatible format by the protocol converter. In some implementations, the protocol converter can be configured to convert a message from any format employed by a participating STB or headend into a format that is compatible with the cluster protocol. If the message is in a compatible format, or once the message has been converted into the cluster protocol, the protocol converter and message router can route 330 the message to one or more subscribing processes. A subscribing process can then access 335 the message for use within the cluster server.

The television distribution system 100 architecture can be scaled to meet the demands of the subscribers. In some implementations, the television distribution system 100 can include one or more server clusters, which can be designated based on geography, subscriber population, or services. Further, a server cluster also can be scaled to meet the demands of subscribers. For example, a plurality of one or more types of elements, such as connection processors, protocol converters and message routers, databases, and processors can be included in the cluster server based on system demand. Additionally, information regarding one or more STBs and headends can be stored in a database included in the server cluster.

Figure 4:
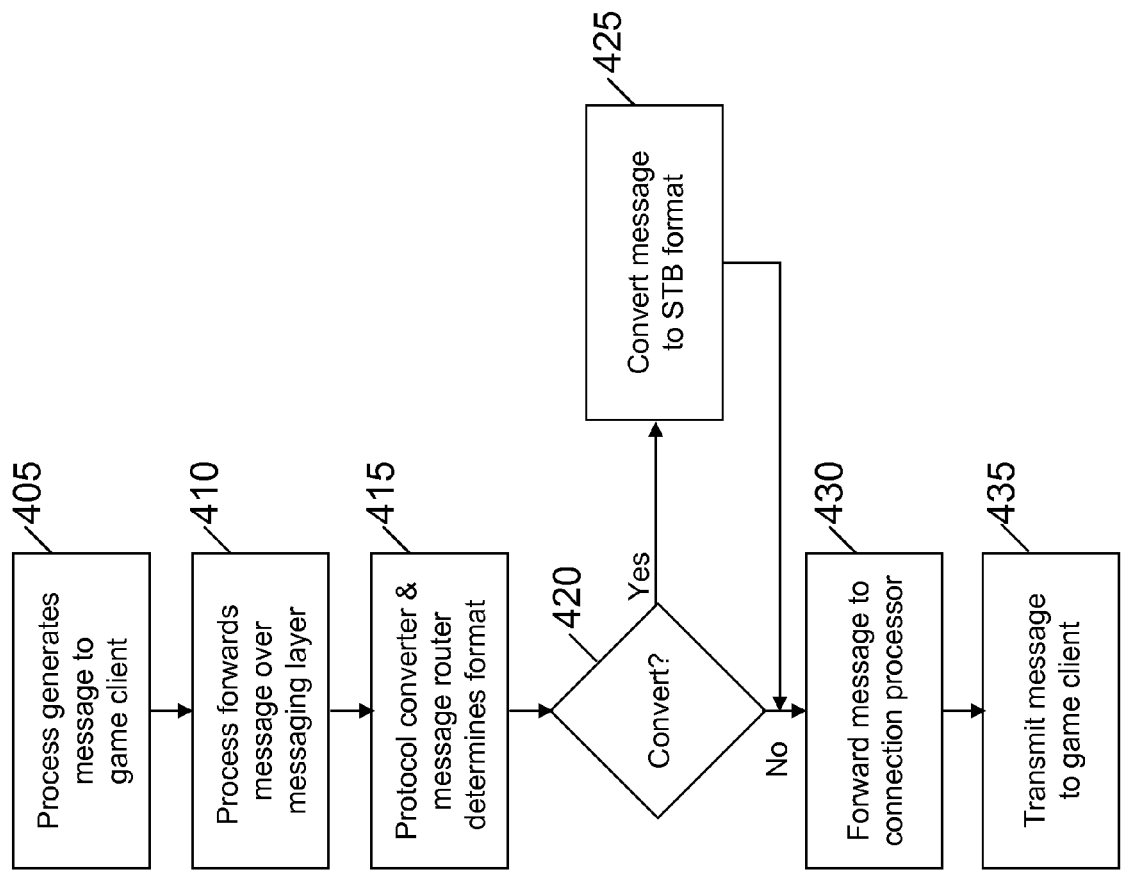
FIG. 4 shows an example of a message flow between a process executing in the server cluster and a set-top box.

FIG. 4 shows an example of a message flow between a process executing in a server cluster of a television distribution system and an STB. A process executing in the server cluster generates a message 405 to an associated game client, such as a message describing the status of a game instance. The message can include an indicator, such as a user identifier, that can be used to deliver (or address) the message. A process executing in the server cluster can be configured to generate messages to one or more associated STBs, such as to manage the execution of a game instance between a plurality of participating subscribers.

The process forwards the message 410 within the server cluster over the messaging layer. For example, the messaging layer can direct the message to one or more message queues that have subscribed to messages relating to the indicator, such as the user identifier, included in the message. In the present example, the message can be inserted into a message queue corresponding to the protocol converter and message router that processes message traffic to the STB with which the indicator is associated. The protocol converter and message router can retrieve the message from the message queue and determine the format 415 associated with the STB to which the message is to be transmitted. Further, the protocol converter and message router can determine whether the message is to be converted 420. For example, if the message format of the cluster protocol is incompatible with the message format of the STB, the message can be converted to the STB format 425.

Once the message has been converted to the STB format, or if the message format already is compatible with the message format of the STB, the message can be forwarded to the associated connection processor 430. Further, the connection processor can transmit the message to the game client hosted on the destination STB 435, such as over the connection with the headend corresponding to the STB. Thus, one or more processes executing in the cluster server can transmit messages to associated STBs. Additionally, processes executing in the server cluster also can communicate with one another over the messaging layer. For example, a game process can publish a scoring message to the messaging layer. Further, the scoring processor can subscribe to all scoring messages. Thus, the messaging layer can insert the scoring message generated by the game process into a message queue associated with the scoring processor.

Figure 5:
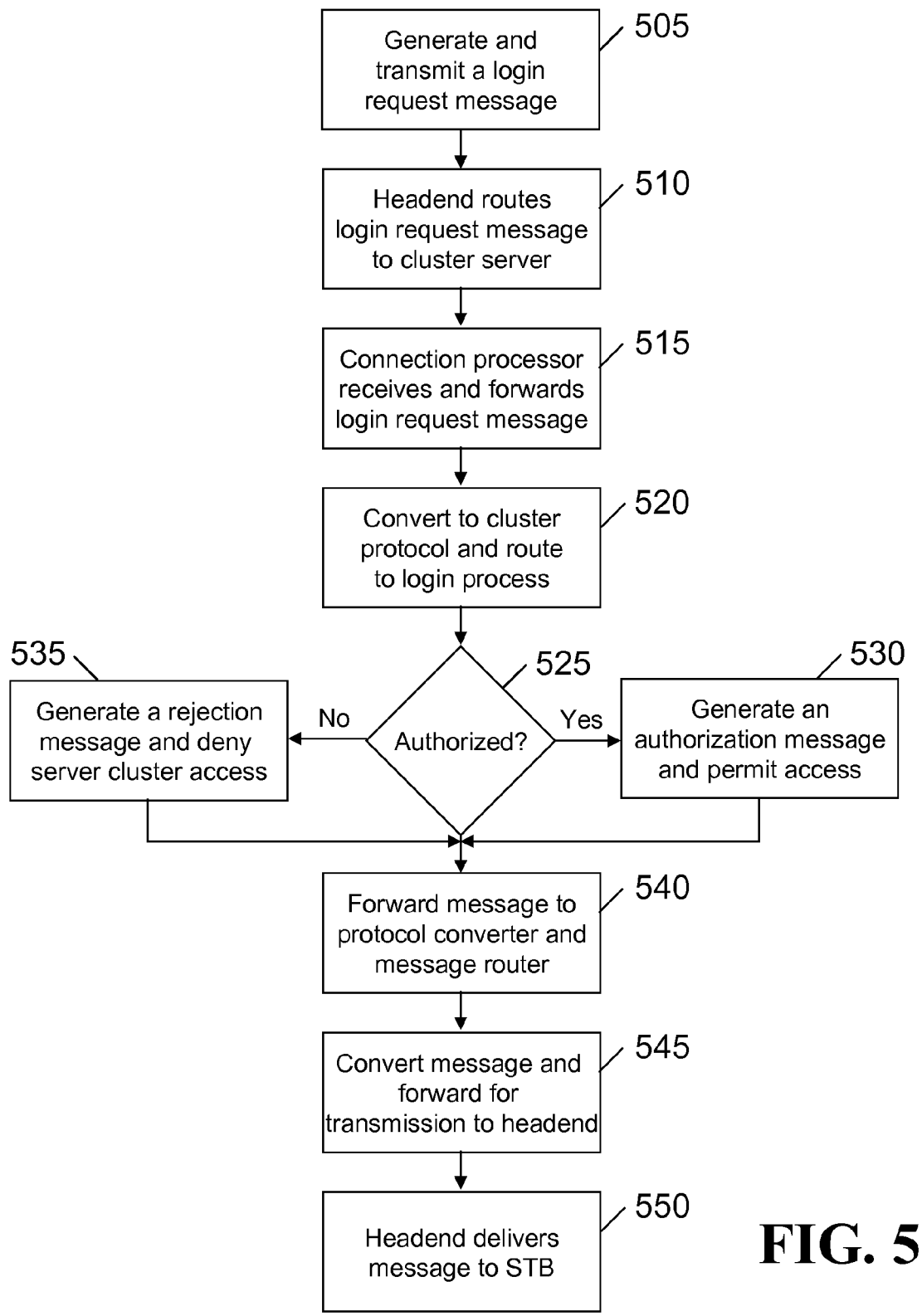
FIG. 5 shows an example of a login message flow between a set-top box and a server cluster.

FIG. 5 shows an example of a login message flow between an STB and a cluster server. A subscriber can initiate a login process by generating and transmitting a login request message 505 through an STB. For example, the subscriber can tune an STB to a channel in the television distribution system 100 on which an interactive service, such as a game, can be accessed. Tuning an interactive services game channel can cause a game portal application resident on the STB to be launched. Further, a login screen can be displayed to the subscriber by the game portal application. The subscriber can use a control interface, such as a remote control device or coupled controller, to enter authentication information, such as a user name and a personal identification number or password.

The login request message can be transmitted from the requesting STB to the headend over a bi-directional communication path. Further, the headend can route the login request message 510 received from the requesting STB over a communication network, such as the internet, to a corresponding cluster server. In some implementations, the headend can route the login request message to the cluster server over an SSL connection. The login request message can be received at the cluster server by a connection processor, which further can forward the message to an associated protocol converter and message router 515.

The protocol converter and message router can convert the login request message into a format compatible with the cluster protocol and then route the login request message to the login process over the messaging layer 520. The protocol converter can be configured to determine the format of the message and can convert between any format utilized by an STB included in the television distribution system 100 and the cluster protocol format. A protocol converter can be updated to include a new conversion routine when an STB with an unsupported protocol or message format is used in the television distribution system 100. The login process can retrieve the login request message from the messaging layer and can determine whether the subscriber supplying the credentials can be authorized 525. For example, the login process can compare the supplied credentials with authorization data stored in the database of the server cluster.

If the login process determines that the subscriber can be authorized, an authorization message can be generated and the subscriber can be given access to the interactive services 530. For example, the login process can assign the subscriber to an initial lobby of the server cluster. If the login process determines that the subscriber cannot be authorized, a rejection message can be generated and the subscriber can be denied access to the interactive services of the server cluster 535. The login response message generated by the login process can be forwarded to the protocol converter and message router 540, such as over the messaging layer. For example, an indicator identifying the requesting STB can be included in the login response message generated by the login process. Further, the protocol converter and message router that forwarded the login request can subscribe to any messages corresponding to the requesting STB. Thus, the messaging queue can insert the login response message into a message queue associated with the subscribing protocol converter and message router.

The protocol converter and message router can convert the login response message into a format compatible with the requesting STB and pass the converted message to the associated connection processor for transmission to the headend 545. For example, the connection processor can transmit the message to the headend over an established connection, such as an SSL connection. The headend can then deliver the login response message to the requesting STB 550. For example, the headend can insert the login response message into a data stream that is provided to one or more STBs, including the requesting STB. The message can be included in a file carousel, which periodically circulates data to the STBs connected to a headend.

Figure 6:
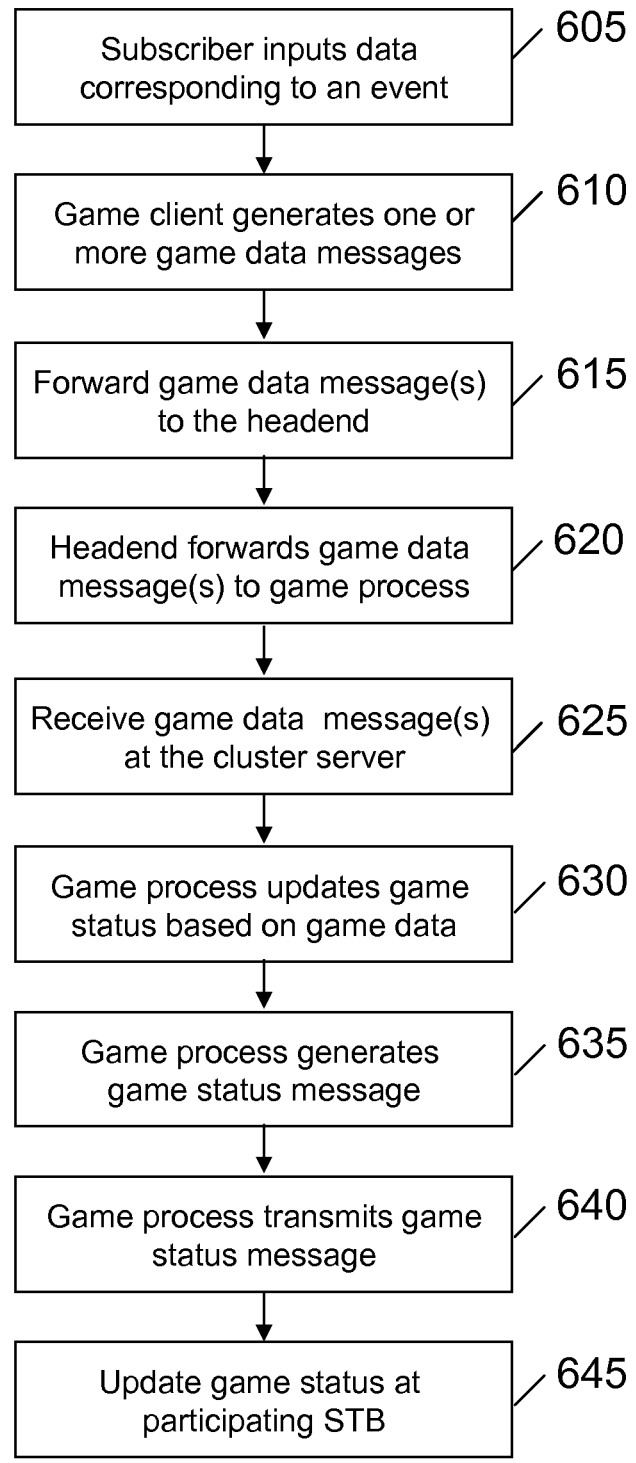
FIG. 6 shows an example message flow relating to the execution of a game instance.

FIG. 6 shows an example message flow relating to the execution of a game instance. A subscriber participating in a game instance can input one or more items of data corresponding to a subscriber event 605. For example, in a billiards game instance, the subscriber can input data describing the position of a pool cue relative to a cue ball and a measure of force to identify a shot. In a poker game instance, the subscriber can input data indicating an action, such as a call, raise, check, or fold.

Once the subscriber submits data representing an event, the game client on the STB with which the subscriber is interacting can generate one or more game data messages 610. The one or more game data messages can be forwarded to the headend to which the STB is connected 615. A game data message can be transmitted from the STB to the headend using any communication protocol supported by the television distribution system. Further, the headend can transmit the one or more game data messages to the cluster server hosting the game process that is controlling the game instance 620. For example, the headend can serve as a proxy for the STB and can route game data messages over a network to the cluster server.

The one or more game data messages generated by the game client can be received at the cluster server 625. For example, a connection processor included in the cluster server can receive messages transmitted to the cluster server by one or more headends. Further, the connection processor can forward the received messages to a protocol converter and message router, which can convert a received message into a format compatible with the elements hosted in the cluster server. The protocol converter and message router also can distribute the message to one or more processes executing in the cluster server, including the game process with which the message is associated.

The game process can update the game status based on the game data included in the one or more game data messages 630. For example, in a billiards game instance, the game process can utilize the shot identified by the game data to calculate the new position of the billiard balls. In a poker game instance, the game process can update the status of the game instance to reflect the subscriber's action. The game process further can be configured to generate a game status message indicating the updated status of the game instance 635. The game status message can include one or more items of data that can be used by the game logic included in the game client to accurately represent the current state of the game instance.

Additionally, the game process can transmit the game status message to one or more participating subscribers 640. For example, the game process can pass the game status message to the messaging layer, which can forward the game status message to a protocol converter and message router to be formatted in accordance with the requirements of the intended recipient STBs. The formatted game status messages can then be passed to a connection processor, which can transmit the messages to one or more headends for distribution to the recipient STBs. Upon receipt of a game status message, a game client associated with a participating STB can update the status of the game. Further, the STB can present the updated game status to a subscriber on the associated display. For example, in a billiards game instance, the game client can update the position of the balls based on the most recent shot. In a poker game instance, the game client can update the hand based on the most recent player action.

Figure 7:
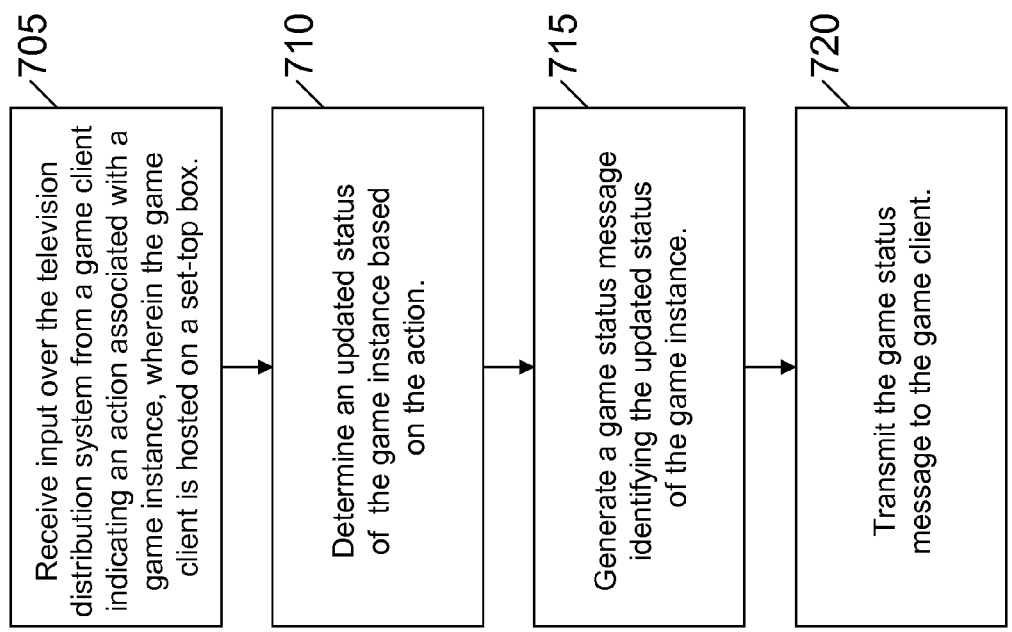
FIG. 7 shows a flowchart for executing an interactive game in a television distribution system.

FIG. 7 shows a flowchart for executing an interactive game in a television distribution system. Initially, input can be received over the television distribution system from a game client indicating an action associated with a game instance, wherein the game client is hosted on a set-top box (705). An updated status of the game instance can be determined based on the action (710). Further, a game status message can be generated identifying the updated status of the game instance (715). Once the game status message has been generated, the game status message can be transmitted to the game client (720).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer/processing device or on multiple computers/processing devices that are located at one site or distributed across multiple sites and interconnected by a communication network.

A number of implementations have been disclosed herein. Nevertheless, it will be understood that various modifications may be made without departing from the spirit and scope of the claims. Accordingly, other implementations are within the scope of the following claims.

What is claimed is:

1. A system comprising:
a set-top box configured to run a game client and to send game messages via a television distribution system, the messages being based on a first message format used by the game client;
a server cluster; and
a protocol converter configured to determine whether the messages are compatible with a cluster protocol used by the server cluster and to selectively convert the messages to a second message format that is compatible with the cluster protocol,
wherein the protocol converter is configured to (i) receive a login request message from the game client to participate in a game instance hosted by the server cluster, (ii) determine a communication protocol of the login request message, (iii) determine whether the communication protocol of the login request message is compatible with the cluster protocol, and (iv) if the communication protocol of the login request message is incompatible with the cluster protocol, convert the login request message to be compatible with the cluster protocol,
wherein the server cluster includes processor electronics configured to perform operations comprising:
receiving, via the protocol converter, the login request message;
verifying, in response to the login request message, that the game client is authorized to participate in the game instance;
assigning the game client to a process corresponding to the game instance;
receiving, via the protocol converter, input from the game client indicating an action associated with the game instance;
determining an updated status of the game instance based on the action;
generating a game status message identifying the updated status of the game instance; and
transmitting the game status message to the game client via the protocol converter.

2. The system of claim 1, wherein the processor electronics are further configured to perform operations comprising:
determining whether the game status message is compatible with the first message format used by the game client; and
selectively converting the game status message to the first message format used by the game client.

3. The system of claim 1, wherein the game status message includes an identifier associated with the game client.

4. The system of claim 1, wherein the processor electronics are further configured to perform operations comprising:
transmitting the game status message to a plurality of game clients participating in the game instance.

5. The system of claim 4, wherein the processor electronics are further configured to perform operations comprising:
receiving input over the television distribution system from another game client indicating a second action associated with the game instance and determining an updated status of the game instance based on the second action.

6. The system of claim 1, wherein the processor electronics are further configured to perform operations comprising: processing the game status message by the game client to generate a current status of the game instance.

7. The system of claim 1, wherein the processor electronics are further configured to perform operations comprising:

tracking a location of a subscriber within a game environment while the game client is connected to the server cluster; and sending, based on a move of the subscriber within the game environment, a notification message announcing the move to one or more other subscribers associated with the game environment.

8. A system comprising:

a set-top box configured to run a game client and to send game messages via a television distribution system, the messages being based on a first message format used by the game client;

a server cluster; and a protocol converter configured to determine whether the messages are compatible with a cluster protocol used by the server cluster and to selectively convert the messages to a second message format that is compatible with the cluster protocol, wherein the server cluster includes processor electronics configured to perform operations comprising:

receiving, via the protocol converter, a request from the game client to participate in a game instance hosted by the server cluster;

verifying that the game client is authorized to participate in the game instance;

assigning the game client to a process corresponding to the game instance;

receiving, via the protocol converter, input from the game client indicating an action associated with the game instance;

determining an updated status of the game instance based on the action;

generating a game status message identifying the updated status of the game instance; and transmitting the game status message to the game client via the protocol converter, wherein the protocol converter is configured to perform operations comprising:

determining whether the game status message is compatible with the first message format used by the game client; and selectively converting the game status message to the first message format used by the game client; and wherein the protocol converter is configured to (i) receive a login request message from the game client to participate in a game instance hosted by the server cluster, (ii) determine a communication protocol of the login request message, (iii) determine whether the communication protocol of the login request message is compatible with the cluster protocol, and (iv) if the communication protocol of the login request message is incompatible with the cluster protocol, convert the login request message to be compatible with the cluster protocol.

* * * * *